United States Patent
Baleine et al.

(10) Patent No.: US 9,366,855 B2
(45) Date of Patent: Jun. 14, 2016

(54) SYSTEM AND METHOD FOR ONLINE INSPECTION OF TURBINES INCLUDING TEMPERATURE AND VIBRATION COMPENSATING LENS MOUNT

(75) Inventors: Erwan Baleine, Orlando, FL (US); Vinay Jonnalagadda, Orlando, FL (US); Michael Savard, Tucson, AZ (US)

(73) Assignee: SIEMENS ENERGY, INC., Orlando, FL (US)

( * ) Notice: Subject to any disclaimer, the term of this patent is extended or adjusted under 35 U.S.C. 154(b) by 858 days.

(21) Appl. No.: 13/362,365

(22) Filed: Jan. 31, 2012

(65) Prior Publication Data

US 2013/0194411 A1 Aug. 1, 2013

(51) Int. Cl.
| | |
|---|---|
| *H04N 7/18* | (2006.01) |
| *G02B 23/24* | (2006.01) |
| *G02B 7/02* | (2006.01) |
| *G03B 17/12* | (2006.01) |
| *G03B 17/55* | (2006.01) |

(52) U.S. Cl.
CPC ............ *G02B 23/2492* (2013.01); *G02B 7/028* (2013.01); *G03B 17/12* (2013.01); *G03B 17/55* (2013.01)

(58) Field of Classification Search
CPC .... G02B 23/2492; G02B 7/028; G02B 17/12; G02B 17/55
See application file for complete search history.

(56) References Cited

U.S. PATENT DOCUMENTS

| | | | |
|---|---|---|---|
| 2,010,014 A | 8/1935 | Elliott | |
| 2,011,006 A | 8/1935 | Maclean | |
| 5,461,445 A * | 10/1995 | Kikuchi | 396/544 |
| 5,555,480 A | 9/1996 | Tanaka et al. | |
| 5,670,784 A | 9/1997 | Cusack et al. | |
| 6,459,481 B1 | 10/2002 | Schaack | |
| 2002/0136548 A1* | 9/2002 | Fuss | 396/89 |
| 2005/0281520 A1* | 12/2005 | Kehoskie et al. | 385/117 |
| 2008/0144186 A1 | 6/2008 | Feng et al. | |
| 2008/0297808 A1 | 12/2008 | Riza et al. | |
| 2009/0027665 A1 | 1/2009 | Ogburn et al. | |
| 2010/0140373 A1 | 6/2010 | Myhre et al. | |

(Continued)

FOREIGN PATENT DOCUMENTS

| | | |
|---|---|---|
| EP | 2023180 A1 | 2/2009 |
| JP | 03200109 A | 9/1991 |

(Continued)

*Primary Examiner* — Dave Czekaj
*Assistant Examiner* — M D Haque

(57) ABSTRACT

Optical camera systems for nondestructive internal inspection of online, operating power generation turbines, including gas turbine combustor and turbine sections that are at high operating temperatures in the range of over 600° C. (1112° F.). The system includes one or more temperature and vibration-compensating lens systems in the optical tube mount. The lens is circumferentially retained within a lens mount, with a mounting ring in contact with only the lens axial face. A biasing element exerts axially oriented biasing force on the first lens face through the first mounting ring, allowing for mount flexure in response to operational turbine vibration and temperature changes. The lens mount is advantageously combined with aspheric lenses capable of withstanding continuous operating temperatures above 600° C. The aspheric lenses, alone or in combination with spherical lenses, establish a wider field of view, and require fewer lenses in combination than lens mounts incorporating only spherical lenses.

16 Claims, 14 Drawing Sheets

(56) References Cited

U.S. PATENT DOCUMENTS

| | | |
|---|---|---|
| 2010/0168981 A1 | 7/2010 | Kominsky |
| 2010/0220182 A1 | 9/2010 | Krull et al. |
| 2010/0321703 A1* | 12/2010 | Harpin et al. ............. 356/477 |
| 2011/0069165 A1 | 3/2011 | Zombo et al. |
| 2011/0229307 A1 | 9/2011 | Lemieux et al. |
| 2011/0261253 A1* | 10/2011 | Chang ....................... 348/374 |
| 2012/0019905 A1* | 1/2012 | Teraoka et al. ............ 359/356 |

FOREIGN PATENT DOCUMENTS

| | | | |
|---|---|---|---|
| JP | H11337795 A | | 12/1999 |
| JP | 2003-215470 | * | 7/2003 |
| JP | 2005227405 A | | 8/2005 |
| JP | 2006039319 A | | 2/2006 |
| JP | 2008242310 A | | 10/2008 |
| JP | 2010085715 A | | 4/2010 |

* cited by examiner

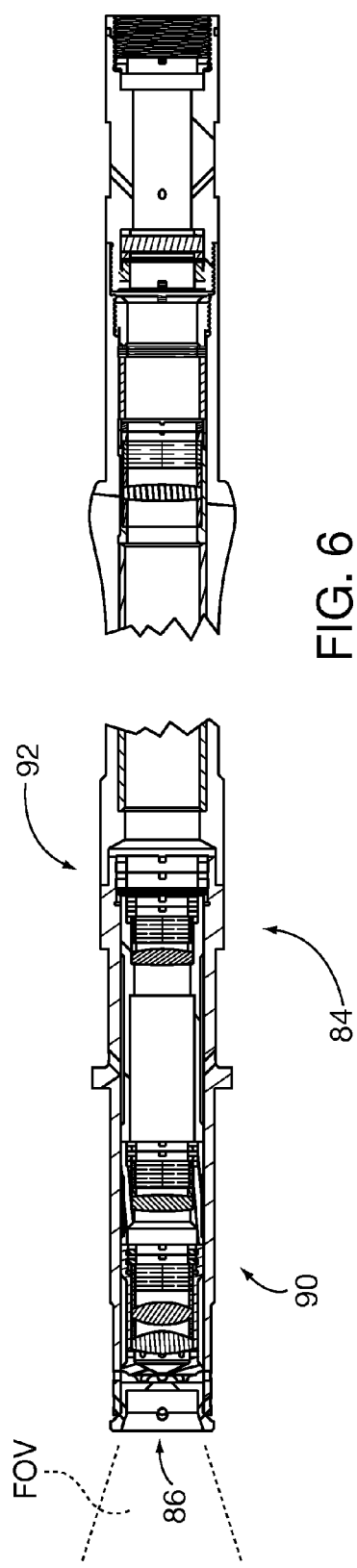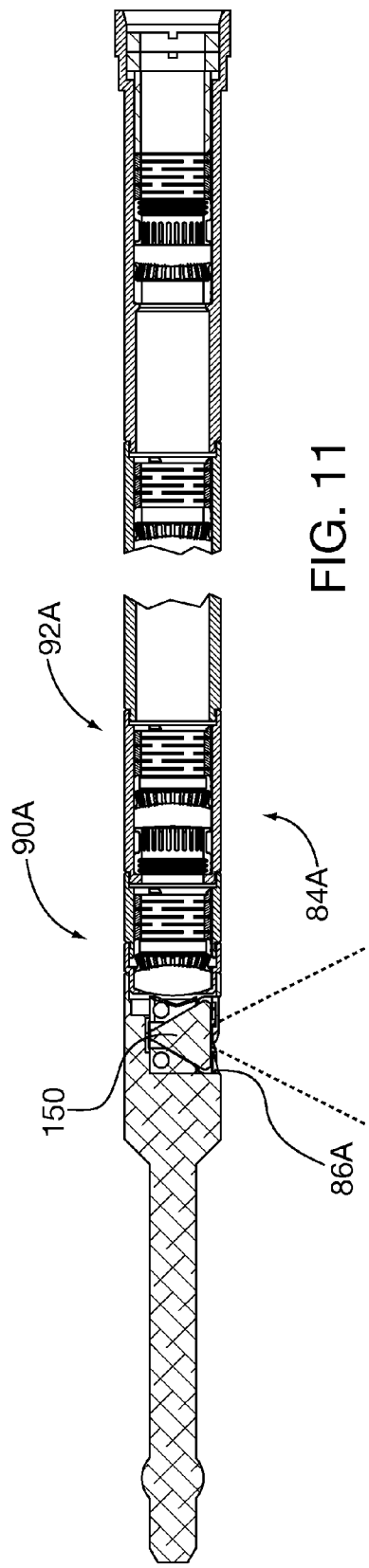
FIG. 6
FIG. 11

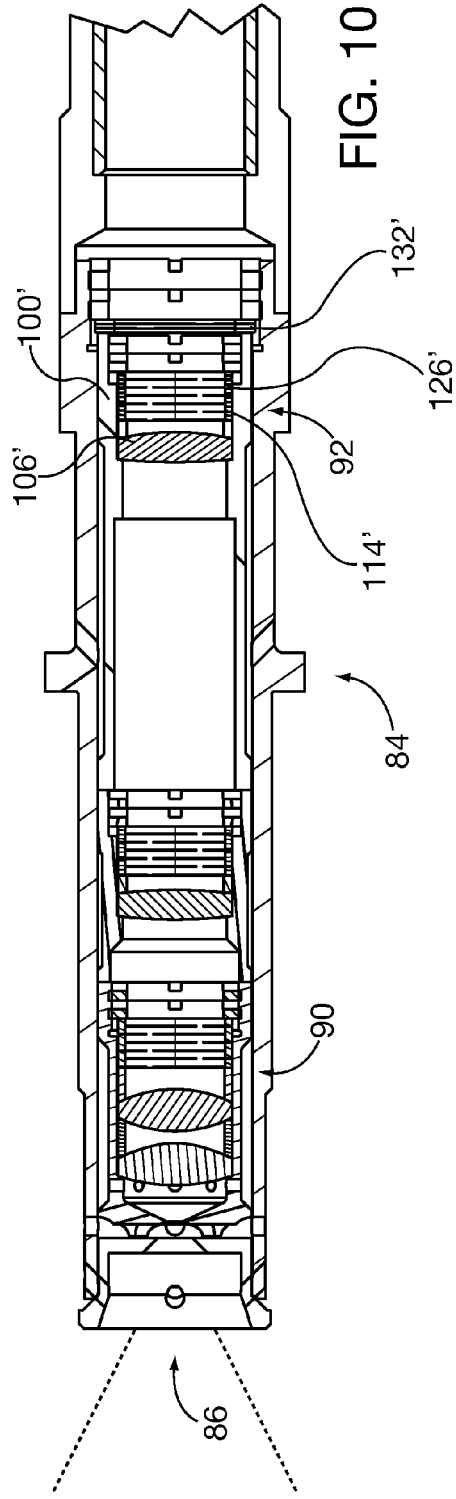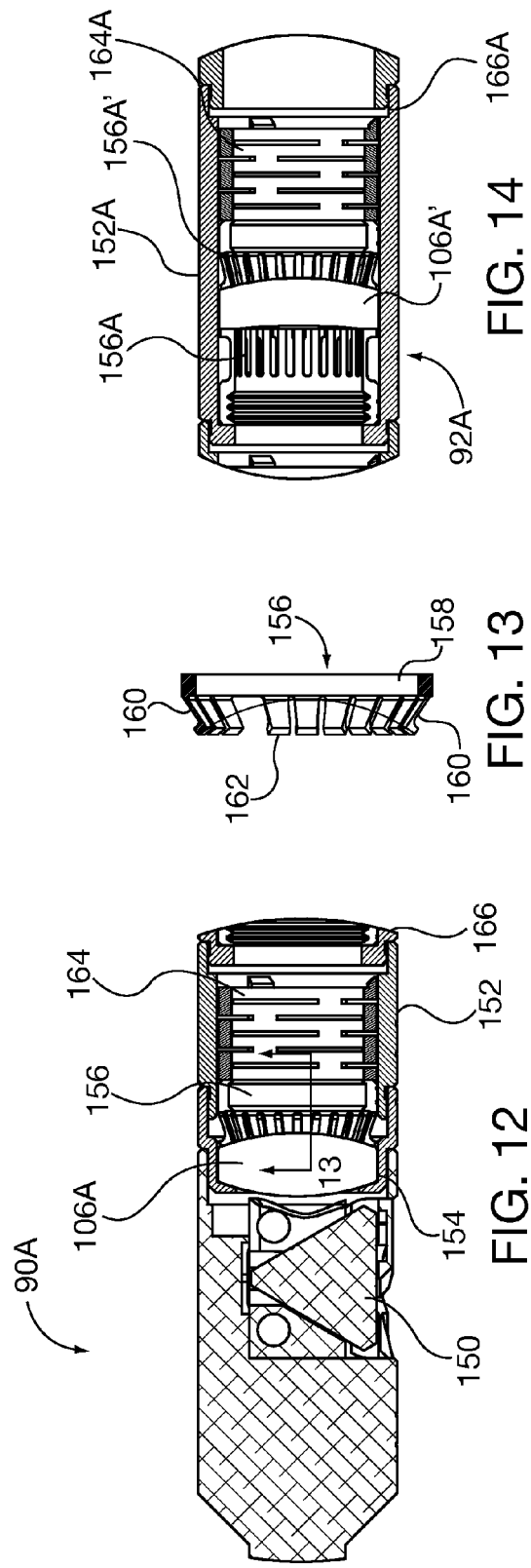

SYSTEM AND METHOD FOR ONLINE INSPECTION OF TURBINES INCLUDING TEMPERATURE AND VIBRATION COMPENSATING LENS MOUNT

CROSS REFERENCE TO RELATED APPLICATION

This application claims the benefit of U.S. Pat. No. 8,896,661 entitled "SYSTEM AND METHOD FOR ONLINE INSPECTION OF TURBINES INCLUDING ASPHERIC LENS", which is incorporated by reference herein.

BACKGROUND OF THE DISCLOSURE

1. Field of the Invention

The invention relates to optical camera systems for nondestructive internal inspection of online, operating power generation turbines, including gas turbine combustor and turbine sections that are at operating temperatures in the range of over 600° C. (1112° F.) and which include combustion gas contaminants.

2. Description of the Prior Art

Infrared or visible spectrum online camera systems monitor critical internal engine components of a power generation gas turbine, steam turbine, generator or their associated equipment during their operation in a power plant, by combining a high temperature optical system with high-speed camera imagery. The optical system design requires selection and combination of lenses, optical material and related lens mounting structure, in order to provide the best image quality while surviving within the harsh operating environments of the equipment. For example, gas turbine combustors and turbine sections contain high temperature combustion gasses that damage and contaminate lens surfaces.

FIGS. 1A and 1B show schematically a known gas turbine 30 having a compressor section 32, a plurality of circumferential combustors 34 and a turbine section 38 through which passes rotating shaft 40. The turbine section 38 includes stationary row 1 vanes 42, as well as row 1 blades 44 that are rotatively coupled to the shaft 40. The turbine section 38 includes successive alternating rows of stationary vanes and rotating blades, such as row 2 vanes 46 and row 2 blades 48. The turbine 30 incorporates a plurality of inspection ports, 36, 50, and 52 to facilitate inspection access to internal components.

As shown in FIG. 1A, camera inspection system 55 is coupled to inspection port 36, and includes an optical tube housing 56 with a viewing port 57 that establishes a field of view of approximately 30 degrees aligned with the housing central axis. Camera 58 captures images transmitted by lenses in the optical tube housing 56. The camera inspection system 55 is useful for inspecting areas of interest within the turbine 30 visible in the field of view, such as for example the leading edges of row 1 vanes 42. Similarly, camera inspection system 55' is coupled to inspection port 50, and includes an optical tube housing 56' with a viewing port 57' that establishes a field of view of approximately 30 degrees aligned normal to the housing central axis (i.e., a lateral or side view). Camera 58 captures images transmitted by lenses in the optical tube housing 56'. The camera inspection systems 55, 55' are useful for inspecting areas of interest within the turbine 30 visible in the field of view. However, as shown in FIG. 1B, the known camera field of view through viewing port 57' is only 30-34 degrees and therefore cannot capture the full width of the leading edge of turbine blade 44.

Current optical designs for real time infrared or visual light spectrum imaging of internal turbine components during online turbine operation suffer from several restrictions which limit the field of view, the maximum operating temperature, the image quality and system operating lifecycle. In order to achieve desired image quality, traditional optical systems require the use of at least one optical material with a temperature limit below 550° C. (1022° F.). In addition, traditional designs use complex groups of tightly spaced spherical lenses involving two or more elements in order to correct optical aberrations.

Traditional optical tube designs for camera imaging systems suffer from design tradeoffs among the field of view, image quality and lens mount system complexity. A larger desired field of view requires greater quantities of lenses with tighter inter-lens spacing. Conversely lens transmittance decreases as the quantity of lenses increases. These design tradeoffs have significant direct negative impact on performance and life of optical systems used in high temperature inspection applications, such as in online gas turbines, as compared to the impact on camera inspection systems used in ambient room temperature inspection applications. More specifically, in order to correct the optical aberrations, traditional optical design uses spherical lenses with a combination of different glass material with convex and concave surfaces. While being able to produce excellent image quality, traditional optical designs pose several challenges when used in a harsh turbine environment. Multiple optical materials with specific but diverse optical, thermal and mechanical structural properties need to be selected: at least one closest to the hot operating environment should have a melting temperature around 600° C. (1112° F.). Few optical materials can withstand such high temperatures without significant loss of optical properties. In order to correct for the aforementioned optical aberration, multiple spherical lenses are required. Previously known high temperature inspection system optical tube designs have used up to six different lenses to produce a sufficient image quality. Increasing the desired field of view for a wider inspection area of interest within the turbine also requires additional lenses. In practice the range/field of view in known high-temperature inspection system optical tubes is 34° or less.

Lens mount mechanical design and operational constraints as well as system useful operating life become more challenging as the number of lenses within the optical tube increases. For example it is more difficult to maintain lens alignment in high temperature inspection applications as the number of lenses in the mount increase, and useful service life suffers accordingly.

Current imaging systems used for uncooled online monitoring in "hot sections" of gas turbines have an operability limited to a maximum of approximately 200-300 hours before needing service and repair. It has been observed that the failure of the imaging system is caused by the progressive wear, breakage or misalignment of the various optical elements which are subject to the heat and vibration of the gas turbine. While this few hundred hour service duration can be sufficient for short time engine performance validation, long term operation is increasingly needed in the industry for the continuous online monitoring of internal turbine parts during their entire operating lifecycle. Gas turbines are intended to be operated continuously between scheduled maintenance cycles. The opto-mechanical components of camera inspection systems cannot be removed from a monitored gas turbine during the latter's operation, until a scheduled maintenance period. Typical maintenance inspection cycles of gas turbines are scheduled every 4000 hours, with typically a major inspection every 8000 hours. It is therefore critical for a continuous online inspection monitoring system to remain operational without disassembly at least 4000 hours before it has a chance to be inspected and serviced. So far, various attempts to increase imaging system service life have lead to marginal improvements from few tens of hours to a few hundred hours.

Thus, a need exists in the art for a high temperature environment inspection system for power system turbines and the like that can withstand continuous operation in temperature environments above 600° C. (1112° F.) and desirably up to 1000° C. (1832° F.). Another need exists for such a system with an increased field of view. Yet another need exists for such a system that reduces the number of individual lenses used in the system, in order to reduce design and operational complexity. There is another existing need to increase optical transmission efficiency while maintaining and preferably increasing image quality. There is another overall need in the art to increase high temperature inspection system operational service life so that it coincides with scheduled turbine maintenance service periods: desirably for 4000 hours.

SUMMARY OF THE INVENTION

Accordingly, potential objects of the present invention, jointly or severally among others, are to create a high temperature environment inspection system for power system turbines and the like that can: withstand continuous operation in temperature environments above 600° C. (1112° F.) and desirably up to 1000° C. (1832° F.); increase field of view; reduce the number of individual lenses used in the system to reduce design and operational complexity; increase optical transmission efficiency; maintain and preferably increase image quality; and increase system operational service life by also incorporating a lens system reduces likelihood of operational degradation caused by the high temperature and vibration environment in an operative online turbine.

These and other objects are achieved in accordance with embodiments of the present invention, by an inspection apparatus featuring a camera lens system that extends useful service life. The lens system provides for flexible lens mounting for thermal and vibration compensation and includes, among other things a lens having a pair of first and second opposed axial faces, and a circumferential edge between the faces. A lens mount having an inner surface circumscribes at least a portion of the lens edge. A first mounting ring is in abutting contact with the lens only along its first axial face. A biasing element is coupled to the lens mount, for exerting axially oriented biasing force on the first lens face through the first mounting ring.

Embodiments of the present invention are also directed to camera inspection systems featuring a camera lens system that includes, among other things, first and second lenses respectively having a pair of first and second opposed axial faces, and a circumferential edge between the faces, with the lenses being axially spaced relative to each other. A lens mount has an inner surface circumscribing at least a portion of each lens edge. Respective first mounting rings are in abutting contact with each corresponding lens only along its respective first axial face. A biasing element is coupled to the lens mount, for exerting axially oriented biasing force on each respective first lens face through its corresponding first mounting ring.

The present invention is also directed to a method for visually inspecting areas of interest within an operating gas turbine, by providing a camera inspection system having a housing defining a viewing port. A lens system is also provided in the housing aligned with the viewing port, including a lens having a pair of first and second opposed axial faces, and a circumferential edge between the faces. A lens mount having an inner surface circumscribing at least a portion of the lens edge is also provided, with a first mounting ring in abutting contact with the lens only along its first axial face. A biasing element is provided, coupled to the lens mount, for exerting axially oriented biasing force on the first lens face through the first mounting ring. The camera inspection system also has a camera coupled to the lens mount, for generating images transmitted through the lens mount. In the method of the present invention the camera inspection system housing viewing port is inserted into an inspection port of a gas turbine prior to operation of the turbine. Thereafter, images of areas of interest within the gas turbine are generated during turbine operation.

In some embodiments of the present invention the lens system includes one or more aspheric lenses that may be mounted in combination with spherical lenses. The combination of the present invention lens mount, capable of temperature and vibration compensation, and the fewer number of needed aspheric lenses in the lens mount optical tube helps to increase imaging system service life. In some embodiments one or more of the lens mount, lenses, mounting ring and biasing elements may be constructed of materials capable of continuous operation at temperatures greater than 1112 degrees Fahrenheit (600 degrees Celsius). In other embodiments one or more lenses are captured between opposed first and second corresponding mounting rings. The mounting ring in some embodiments is flexible, with a mounting rim having a mounting rim edge in opposed relationship with the lens mount inner surface; and a plurality of flexible cantilever fingers respectively having proximal ends coupled to the mounting rim, and distal ends projecting axially away from the rim that are in biased abutting contact with an associated lens only along the lens axial face.

In some embodiments the lens system is incorporated in an optical tube housing retaining the lens mount that also has a viewing port defined by the housing that is aligned with the lens. A cooling port is defined by the housing proximal the viewing port; with a pressurized gas source coupled to the cooling port, for discharging pressurized gas proximal the viewing port. The optical tube housing with lens mount, along with a camera, are incorporated in a camera inspection system.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIG. 6 is a schematic cross-sectional view of an optical tube housing of an embodiment of the present invention, wherein an image is taken in line with the tube central axis;

FIG. 10 is a schematic cross-sectional view of another lens mount in the FIG. 6 optical tube housing embodiment of the present invention;

FIG. 11 is a schematic cross-sectional view of an optical tube housing of another embodiment of the present invention, wherein an image is taken normal to the tube central axis;

FIG. 12 is a schematic cross-sectional view of a lens mount in the FIG. 11 optical tube housing embodiment of the present invention;

FIG. 13 is a radial cross-sectional view of another embodiment of a mounting ring in the FIG. 12 lens mount of the present invention;

FIG. 14 is a schematic cross-sectional view of another lens mount in the FIG. 11 optical tube housing embodiment of the present invention;

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in optical camera systems for nondestructive internal inspection of online, operating power generation turbines, including gas turbine combustor and turbine sections that are at high operating temperatures in the range of over 600° C. (1112° F.) and which include combustion gas contaminants. The inspection system includes one or more aspheric lenses capable of withstanding continuous operating temperatures above 600° C. The aspheric lenses, alone or in combination with spherical lenses, establish a wider field of view, and require fewer lenses in combination than lens mounts incorporating only spherical lenses. A cooling system incorporated in the inspection system facilitates continuous operation and inhibits lens external surface fouling from combustion gasses.

Aspheric Lens Optics

In order to improve "hot" inspection imaging opto-mechanical performance, and reduce the mechanical assembly complexity, aspheric lens elements—preferably constructed of fused silica, material—to replace at least some of the known conventional spherical lens elements. Fused silica is an optical material with high temperature resistance. The lens surface contour can be fabricated by employing known single-point diamond turning manufacturing techniques. Sapphire or transparent ceramics, such as spinel and aluminum oxynitride (AlON), areother potential high temperature application lens materials.

Figures 2A, 2B:
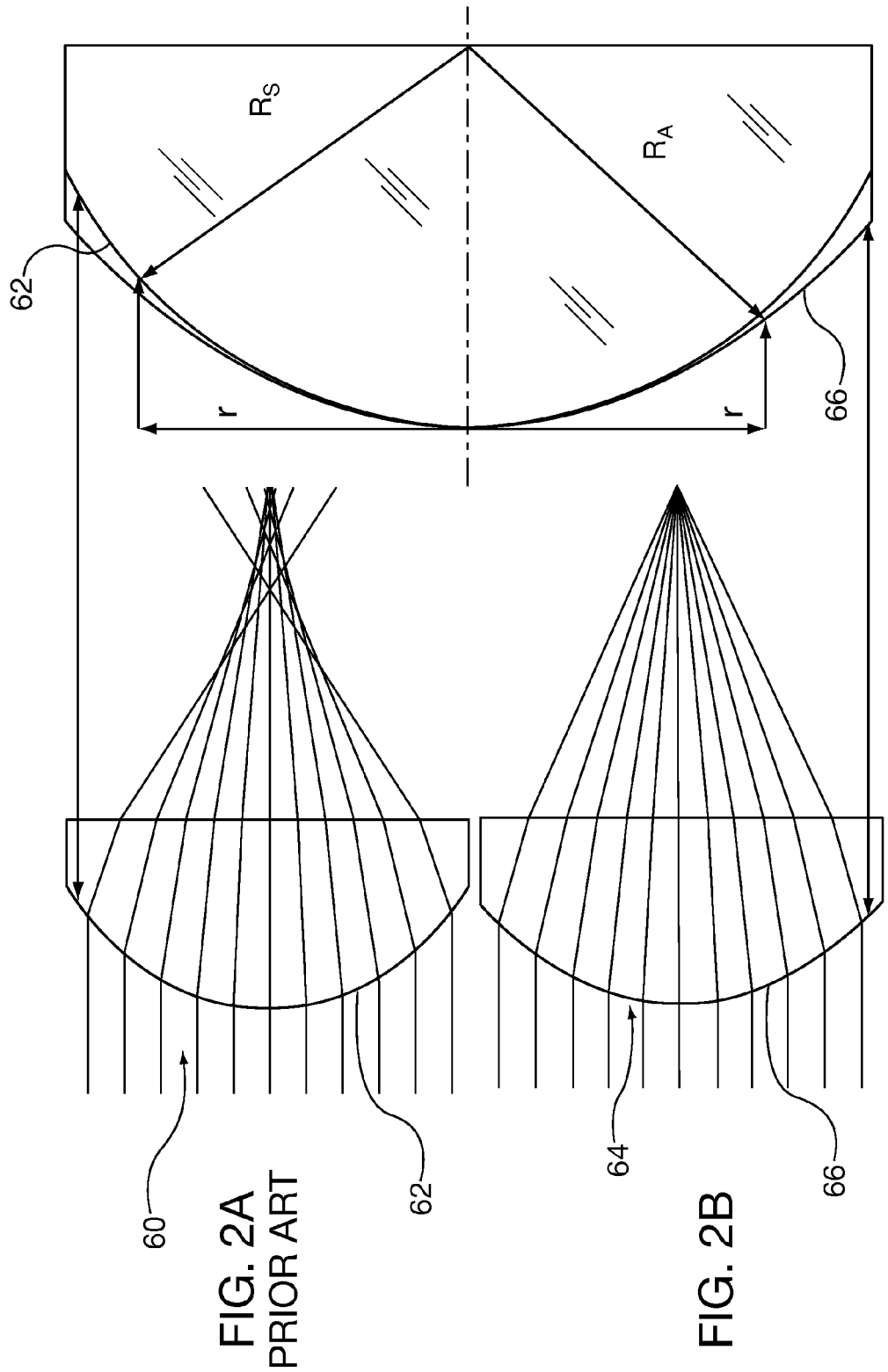
FIG. 2A is a schematic elevational view of a known spherical lens.
FIG. 2B is a schematic elevational view of an aspheric lens of the present invention.
Figure 3A:
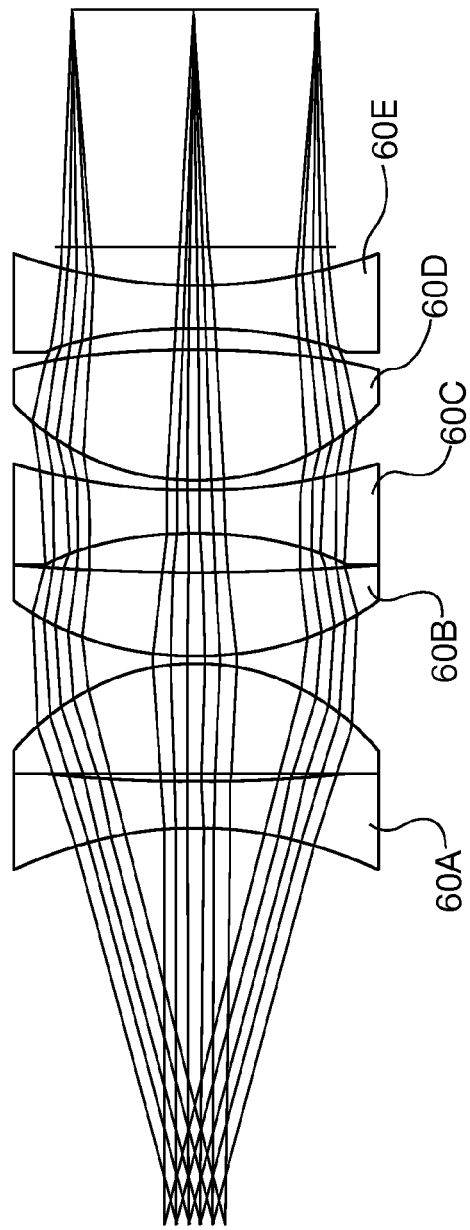
FIG. 3A is a schematic elevational view of a known camera lens system incorporating a spherical lens stack, for forming an image of an object of interest located within a field of view (FOV) of the lenses.
Figure 3B:
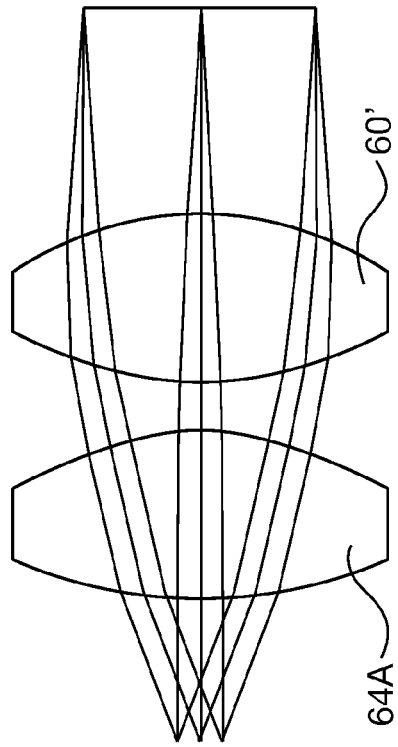
FIG. 3B is a schematic elevational view of camera lens system of the present invention that incorporates an aspheric lens of the present invention.

As shown in FIG. 2A a known lens 60 with a spherical surface 62 is fully determined by its constant radius, while an aspheric surface requires a known multi parameters equation to describe its shape. An optical advantage of a lens 64 with an aspherical surface 66 is shown in FIG. 2B, where the rays of light converge to a single point. In the case of the spherical lens 60, FIG. 2A, the rays of light form a blur which reduces the image quality. In known spherical-only lens arrays, such as shown in FIG. 3A, a plurality six spherical lenses 60-60E are needed to sharpen the blurred image. In contrast, the aspherical lens 64A, in combination with spherical lens 60', are sufficient to compensate for the optical aberrations and generate a sufficiently sharp image on the camera sensor. An imaging inspection camera system with a lens array including an aspherical lens increases system operational life. The total number of lenses is reduced, in turn leading to reduction in the mechanical assembly complexity. Fewer components to malfunction and/or misalign positively impacts inspection system service life. The reduction in lens quantity advantageously attributes to increased light transmission, because of less attenuation between fewer successive lens material layers. Fused silica and sapphire aspheric lens materials will operate at a temperature of 1000° C. in continuous operation and 1200° C. for shorter term intermittent operation. The inspection system field of view can be increased to 50 degrees while maintaining an acceptable mechanical assembly level of complexity. Known systems with spherical lenses were limited to fields of view of 34 degrees or less.

Known Lens Mount Limitations

Figure 4:
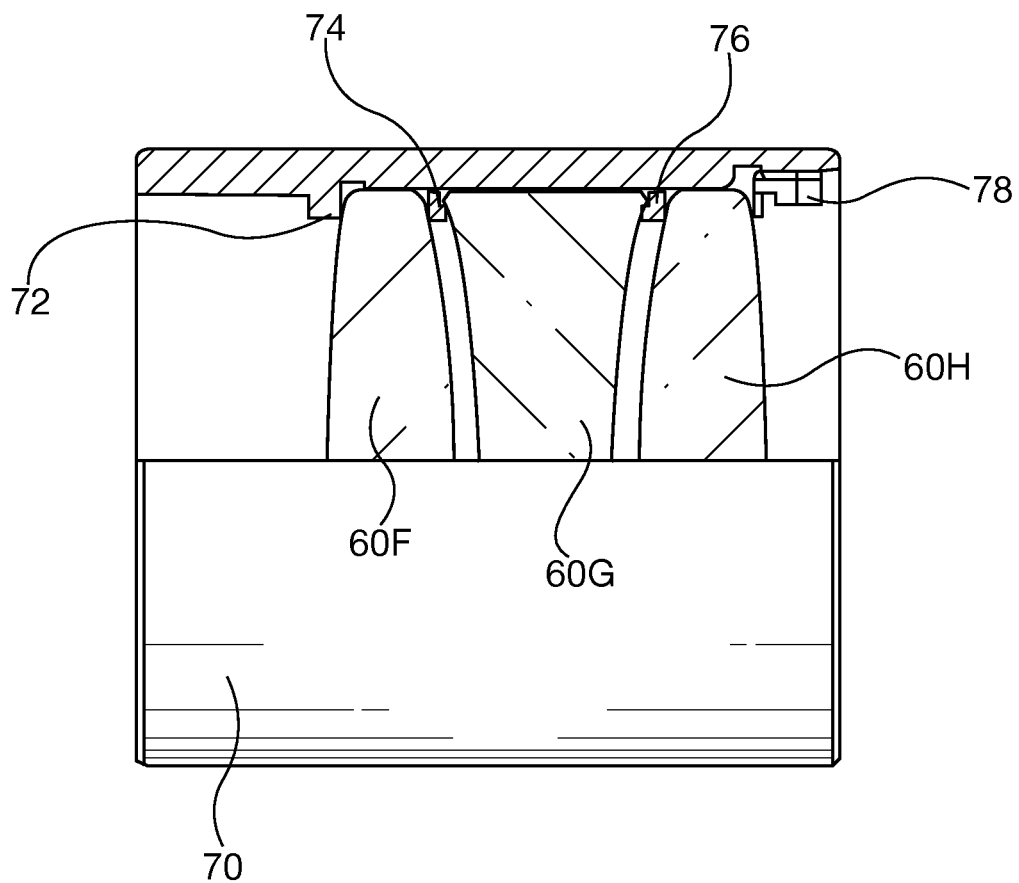
FIG. 4 is a schematic elevational view in partial cross-section of a known lens mount for a camera lens system.

Some embodiments of the system of the present invention additionally feature a temperature and vibration compensating lens mount, compared to the typical known inspection system rigid lens mount construction shown in FIG. 4. In that exemplary known lens mount, spaced apart spherical lenses 60E-60H are retained in a mount barrel 70 by a series of spaced rigid formed flanges 72, rigid spacer rings 74, 76 and retainer ring 78. Due to varying thermal expansion rates of the barrel, retaining rings, and non-metallic lenses, the lenses are subject to external deformation stresses, making them susceptible to stress cracking and/or misalignment.

Inspection System Overview

Figure 1A:
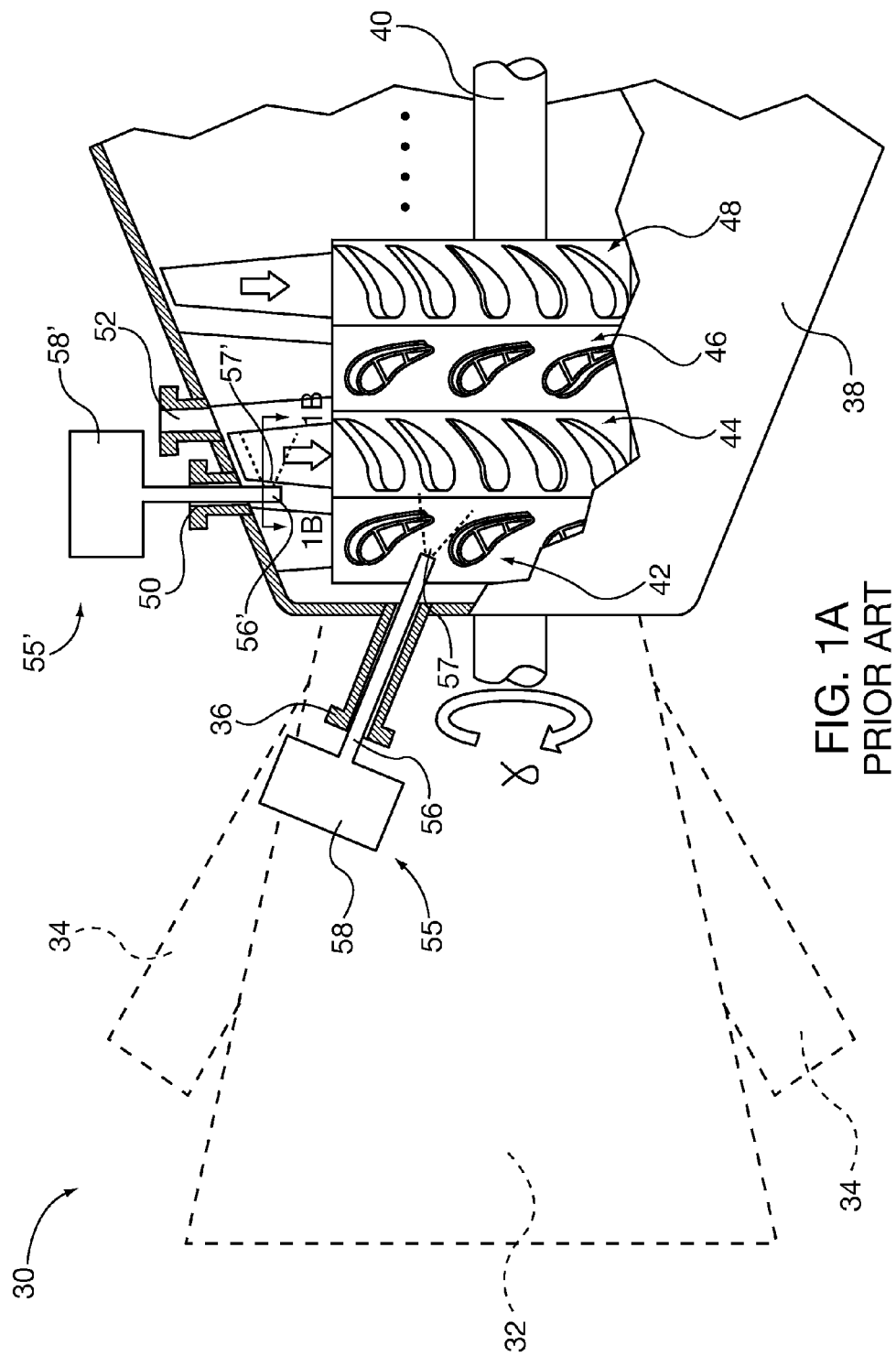
FIG. 1A is a schematic elevational view of a gas turbine being inspected with known camera inspections systems.
Figure 1B:
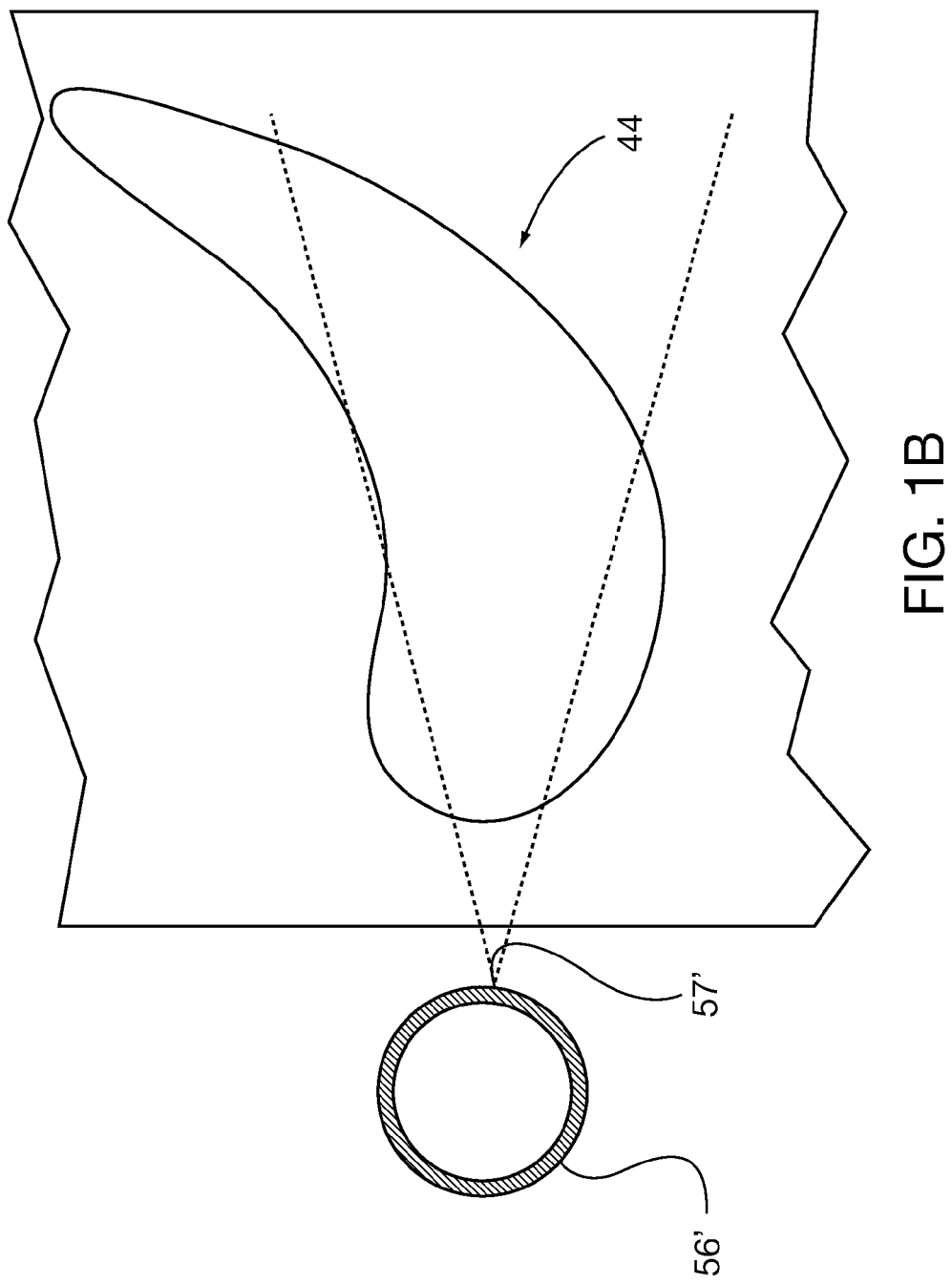
FIG. 1B is a schematic plan view taken along 1B-1B of FIG. 1.
Figure 5:
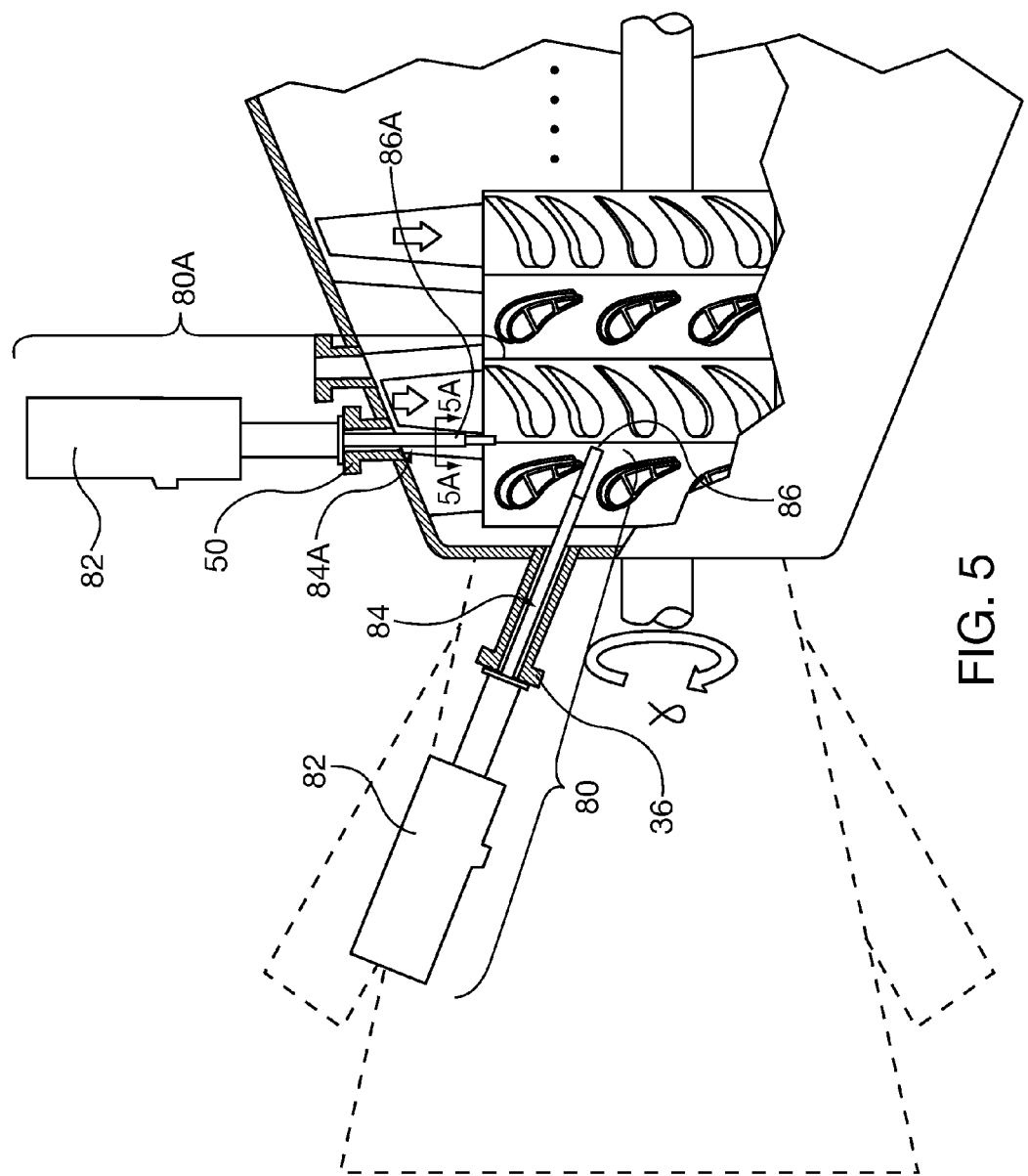
FIG. 5 is a schematic elevational view of a gas turbine being inspected with camera inspection systems of the present invention.
Figure 5A:
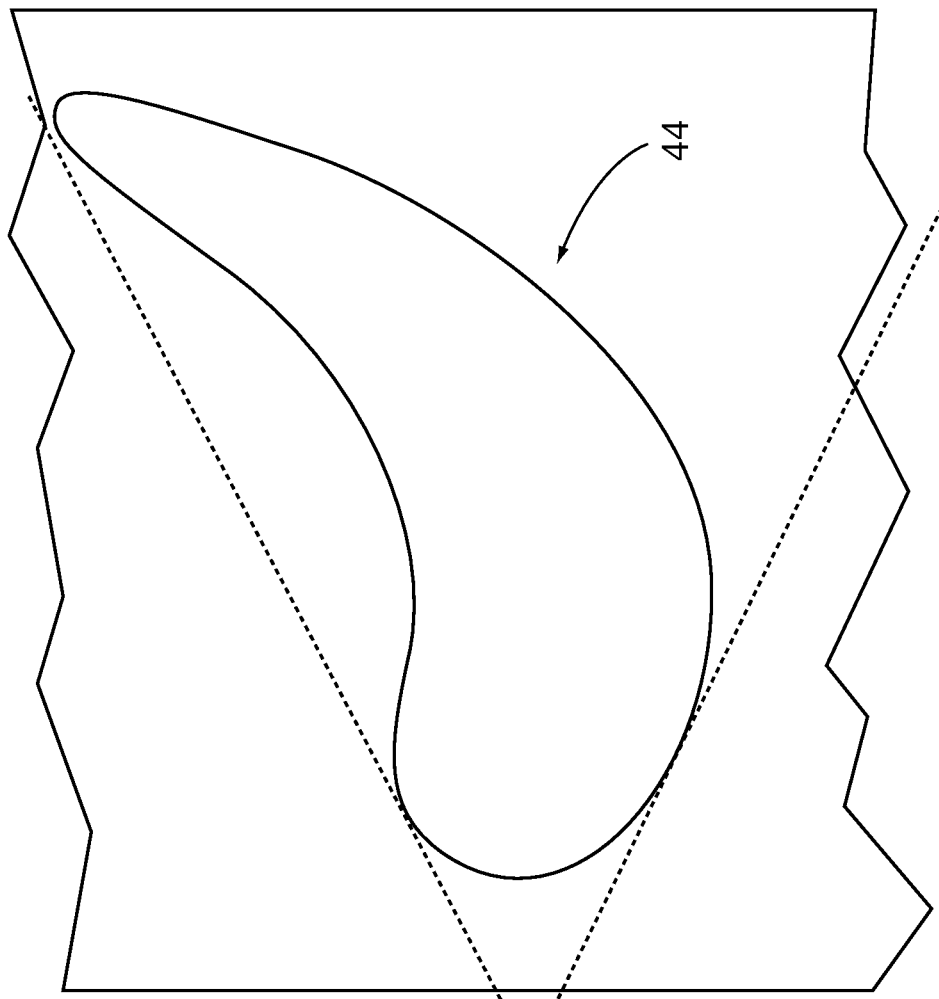
FIG. 5A is a schematic plan view taken along 5A-5A of FIG. 5.

FIG. 5 is a schematic elevational view of an operational, online gas turbine 30 being inspected with camera inspections systems of the present invention. In particular, the leading edges of first row vanes 42 are being inspected in real time by inspection system 80, while inspection system 80A inspects the leading edges of the first row turbine blades 44. While the figure shows simultaneous use of two inspection systems in specification inspection locations, the number of inspection systems and their locations can be varied at the discretion of the user. Both of the respective inspection systems each have a camera enclosure 82, optically coupled to an optical tube housing 84, 84A (having a plurality of lenses therein retained by lens mounts) that transmit an image within a field of view established through viewing port 86, 86A. Viewing port 86 in the gas turbine inspection system 80 is oriented on the distal tip of optical tube housing 84, so that its field of view aligns with the central axis of the housing. The viewing port 86A is laterally oriented on a circumferential side of optical tube housing 84A, so that its field of view is aligned at an angle normal to its housing central axis. As shown in FIG. 5, the inspection system viewing port 86A generates images of the leading edges of the turbine blades 44. FIG. 5A depicts schematically the advantages of a 50° or greater field of view (FOV) as compared to the 34° or less field of view (FOV) of the prior art known camera inspection system 55 shown in FIGS. 1A and 1B. The larger 50°+FOV angle allows inspection of a larger portion of an area of interest (here the exemplary turbine blade 44 leading edge) than is possible with a known inspection system having a 34° or less viewing angle.

Optical Tube Housing and Lens Mount

Figure 7:
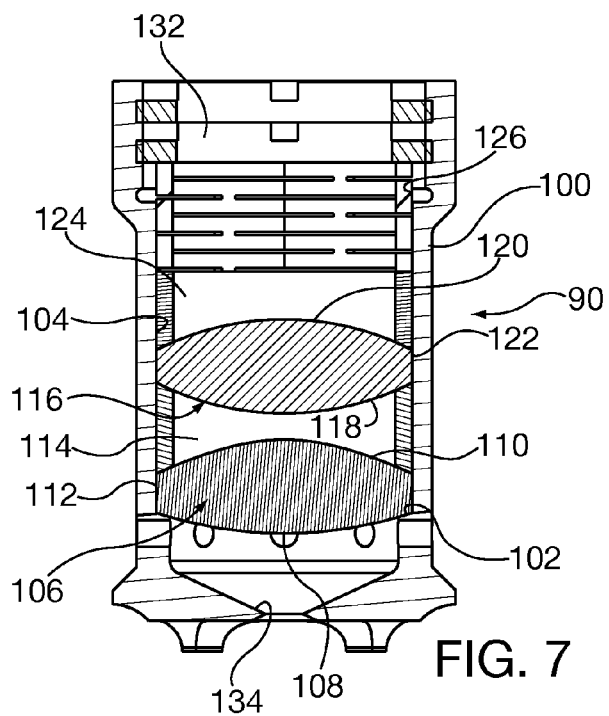
FIG. 7 is a schematic cross-sectional view of a lens mount in the FIG. 6 optical tube housing embodiment of the present invention.
Figure 8:
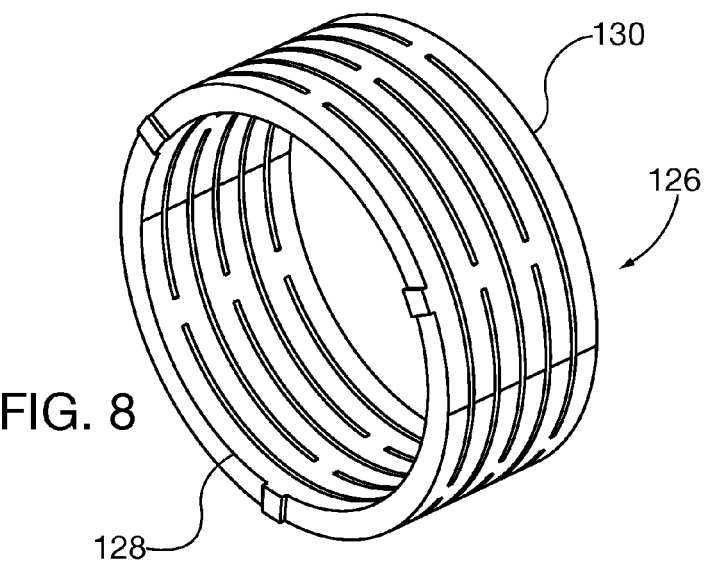
FIG. 8 is a perspective view of an axial compression spring in the FIG. 7 lens mount of the present invention.
Figure 9:
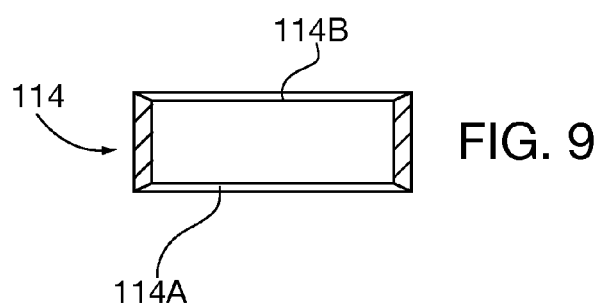
FIG. 9 is a perspective view of a mounting ring in the FIG. 7 lens mount of the present invention.

FIGS. 6-15 show the optical tube embodiments 84, 84A as well as exemplary embodiments of lenses and lens mounts of the present invention. Referring to FIG. 6, optical tube housing 84 has viewing port 86 oriented on its distal tip. The distal lens mount 90 and intermediate lens mount 92 are retained within the metallic optical tube housing 84 and in turn retain different lens configurations. As shown in FIGS. 7-9, distal tip lens mount 90 has a metallic lens mount barrel 100, constructed in a tubular configuration, with integral lens retaining flange 102, and an inner circumference 104 that circumscribes and captures aspheric lens 106. While the lens mount 100 fully circumscribes lens 106, at the discretion of one skilled in the art it may be constructed to circumscribe only a portion of the lens.

Aspheric lens 106 has a front face 108 that abuts retaining flange 102, and a rear face 110. Circumferential edge 112 defines the radial boundary of the lens 106. The retaining flange 102 local profile that abuts the lens 106 matches the front face 108 local profile, for symmetrical pressure about the lens circumference. Spherical lens 116 is in spaced relationship and alignment with the aspherical lens 106, and has a front face 118, a rear face 120, and circumferential edge 122. Alignment and spacing between the lenses 106 and 116 is established by annular/tubular metallic first mounting ring 114 (FIG. 10); its front face 114A localized profile conforms to the aspheric lens rear face 110 local profile and its rear face 114B profile conforms to that of the spherical lens front face 118. Second tubular metallic mounting ring 124 has a front face with a profile matching that of the local profile of the spherical lens rear face 120.

Capture of each of the lenses 106, 116 circumferentially within the inner circumference 104 of the mount barrel 100 and axially by the corresponding matching, abutting profiles of the lens faces and mounting rings maintains desired lens alignment for image quality, despite operational temperature variations and vibration in the turbine. Compression spring 126 (FIG. 10) is a biasing element that exerts constant axial force on the front and rear faces of the lenses 106, 116 despite temperature and vibration variances during turbine operation. In this manner, the lenses 106, 116, retaining rings 114, 124, and lens mount barrel 100 are able to experience different rates of axial expansion/contraction while maintaining a relatively constant axial biasing force among all of those respective components. The compression spring 124 is formed by cutting a solid stainless steel tube by electric discharge machining. Other profile spring biasing elements may be substituted for the compression spring 124. The compression spring first end 128 abuts the second retaining ring 124 and the second end 130 abuts a spring retaining ring 132 that is captured within the housing 100. Alternatively the compression spring second end 130 may be permanently attached to the housing inner circumference by welding or the like, in lieu of a spring retaining ring, 132, if it is desired to reduce axial length of the distal lens mount 90. The distal lens mount 90 also has a distal lens mount viewing port 134, which is aligned with the optical tube housing 84 viewing port 86.

As shown in FIG. 10, the intermediate lens mount 92 has a single aspheric lens 106' circumferentially captured within lens mount barrel 100' and retained axially by first mounting ring 114', along with biasing element compression spring 126' and in turn spring retaining ring 132'.

The lateral or side-viewing optical tube 84A embodiment is shown in FIG. 11. Lateral viewing is enabled by prism 150 that optically bends the spectral frequency waves (e.g., infrared or visible spectrum) to alignment with the distal lens mount 90A (FIG. 12), having an aspherical lens 106A, and in turn the intermediate lens mount 92A (FIG. 14), having aspherical lens 106A'.

An exemplary distal lens mount 90A is shown in FIG. 12, and includes lens mount barrel 152 to which is joined lens front mounting retainer 154. The retainer 154 abuts against aspherical lens 106A; the abutting surface profile corresponds to the lens front or first face local profile. Flexible lens mounting ring 156 also has a surface profile corresponding to the lens 106A second or rear face, and axially abuts against the lens due to axial biasing pressure exerted by the compression spring axial biasing element 164 and spring retaining ring 166. As shown in FIG. 13, the flexible lens mounting ring 156 has a rim 158 and a plurality of cantilever fingers 160 projecting axially away from the rim 158. The fingers 160 have distal contact surfaces 162 having a profile corresponding to the local profile of the abutting lens 106A. The flexible lens mounting ring adds additional biasing force against the abutting lens 106A, and can compensate for localized bending in the lens mount barrel 152. Alternatively, solid retaining rings, such as those used in the lens mounts 90, 92 of respective FIGS. 7 and 10, can be substituted for the flexible lens mounting rings 156 in lens mount 90A or in other exemplary embodiment mounts.

In the intermediate lens mount 92A, shown in FIG. 14, lens mount barrel 152A circumferentially captures lens 106A' and axially retains the lens between opposing flexible lens mounting rings 156A and 156A'. Compression spring 164A exerts axial biasing force on the lens 106A', in conjunction with the opposed flexible mounting rings 156A and 156A'. Spring retaining ring 166A retains the spring 164A within the lens mount barrel 152A.

Figure 15:
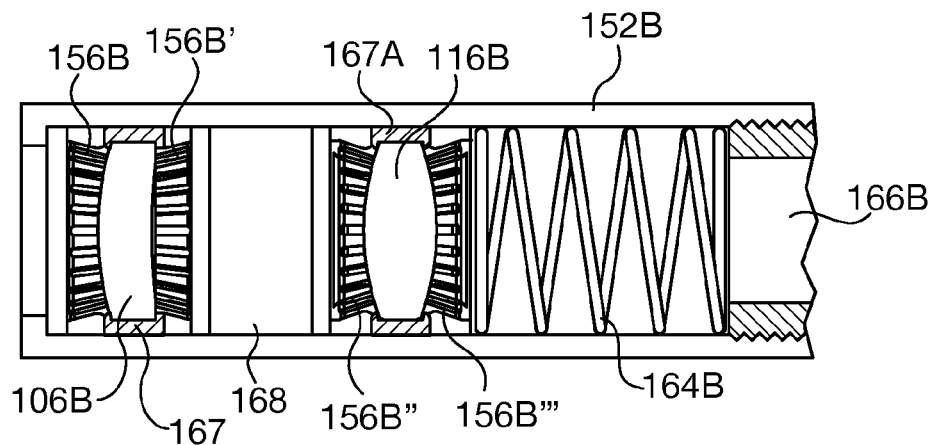
FIG. 15 is a schematic cross-sectional view of yet another lens mount embodiment of the present invention.

FIG. 15 shows an exemplary embodiment of two tandem aspheric 106B and spherical 116B lenses respectively retained by flexible mounting ring pairs 156B, 156B' and 156B", 156B'". The lenses 106B and 116B are separated by spacer bushing 168 and are circumferentially restrained by respective elastic metallic annular bushings 167, 167A that are interposed between the lens circumferential edge and the lens mount barrel 152B. Compression spring 164B (here shown as a helical spring), in conjunction with the biased, flexible cantilever fingers on each of the ring pairs 156B, 156B' and 156B", 156B'" maintains biased axial pressure on the lenses 106B and 116D, in order to compensate for thermal and vibration-induced distortion within the lens mount 164B or the optical tube 84A structure. The elastic annular metallic bushings 167 provide additional vibration damping and flexure compensation for the lenses 106D, 116B. The compression spring 164E is retained within housing 152B by threaded spring retaining ring 166B.

Optical Tube Cooling and Lens Cleaning

The inspection system of the present invention may additionally employ a cooling system that injects pressurized gas around the exterior circumference of the optical tube housing and also directs the pressurized gas into a cooling port that is oriented proximal the optical tube viewing port. The pressurized gas source can be compressed air that is shunted from the turbine compressor section or any external pressurized air or other gas source that is available within the power plant.

Figure 17:
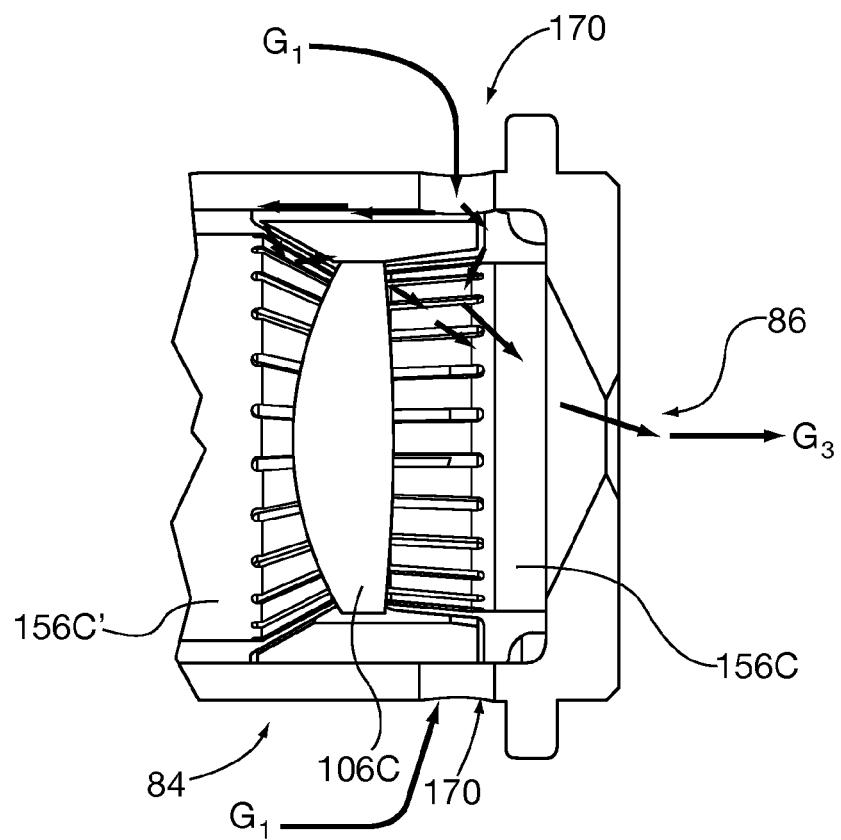
FIG. 17 is a detailed schematic cross-sectional elevational view of the cooling system of FIG. 16.
Figure 16:
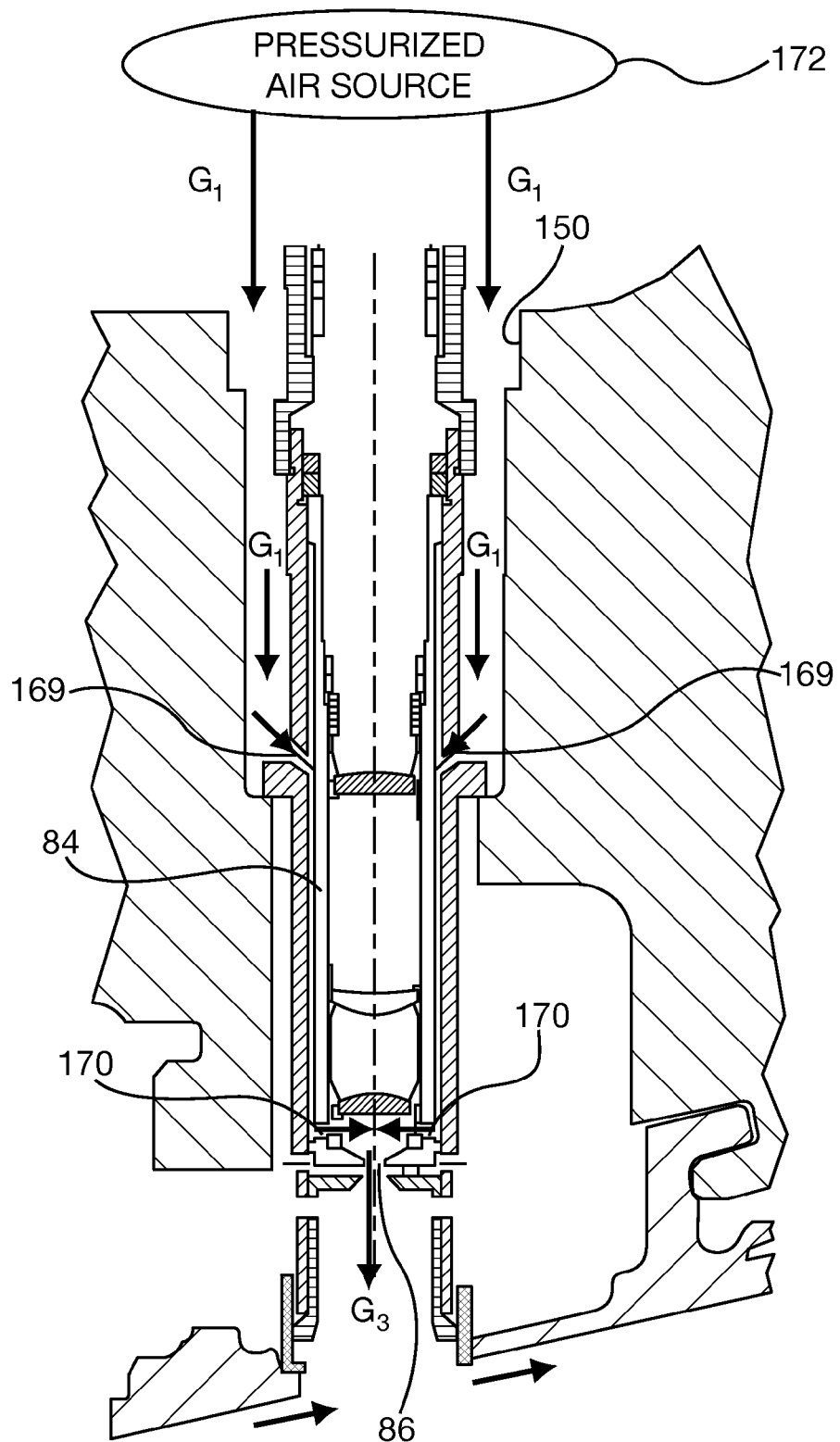
FIG. 16 is a schematic cross-sectional elevational view of inspection system of the present invention including a cooling system.

Referring to FIGS. 16 and 17, optical tube housing 84 is inserted into an inspection port of a gas turbine. The pressurized air source 172 is main cooling air from the gas turbine discharge cavity, having a temperature of approximately 450° C. (842° F.), which is lower than the 600° C. (1112° F.) or higher ambient temperature within the turbine section. The main cooling air $G_1$ has a higher relative pressure than that within the turbine section gas path $G_6$. Cooling air $G_1$ is routed through cooling ports 169 and flows axially downwardly along the exterior circumference of the optical tube housing 84. Cooling ports 170 formed within the optical tube housing 84 direct cooling air flow proximal to and in front of the aspheric lens 106C and its flexible lens mounting ring 156C, whereupon it exits the viewing port 86 as shown as the gas flow path $G_3$. The cooling gas flow $G_3$ has a higher pressure and lower temperature than the combustion gas path $G_6$ that is within the turbine section. As a result, the cooling gas path $G_1$-$G_3$ transfers heat away from the optical tube housing 84, viewing port 86 and the aspheric lens 106C, and is a thermal barrier insulation layer from the higher temperature combustion gas $G_6$. The barrier layer of cooling gas $G_3$ also maintains a layer of relatively "clean" contaminant-free gas in front of the aspheric lens 106C, so that the lens is less susceptible to collecting smudging contamination film from contaminants in the combustion gas.

Inspection System Electronics and Operation

Figure 19:
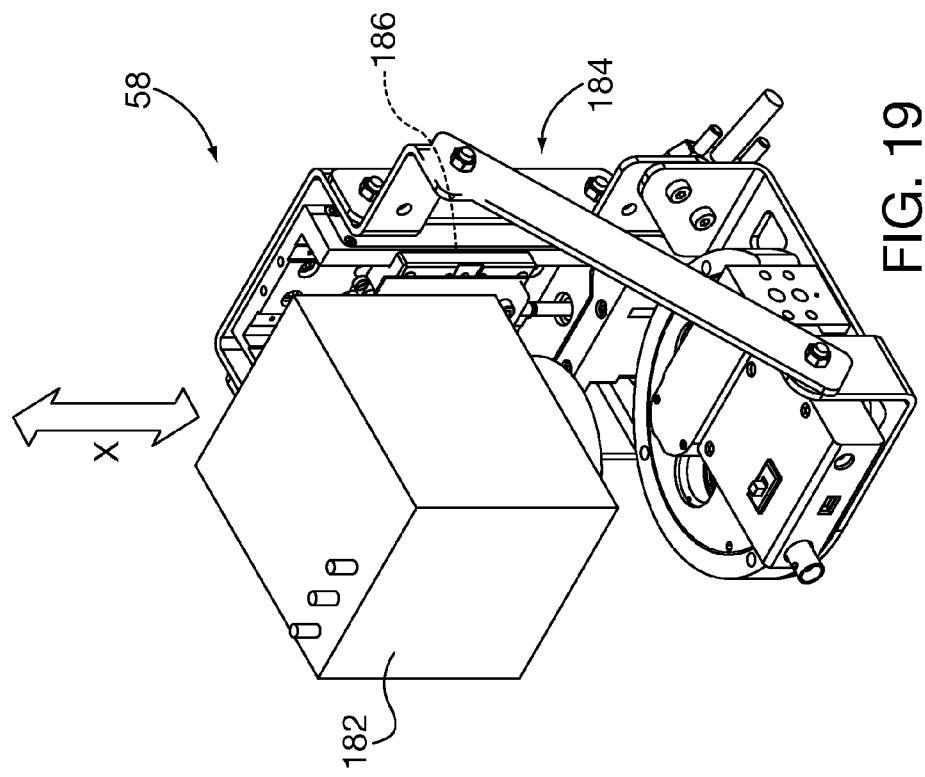
FIG. 19 is schematic elevational perspective view an inspection camera focus adjustment mechanism of an inspection system of the present invention.
Figure 18:
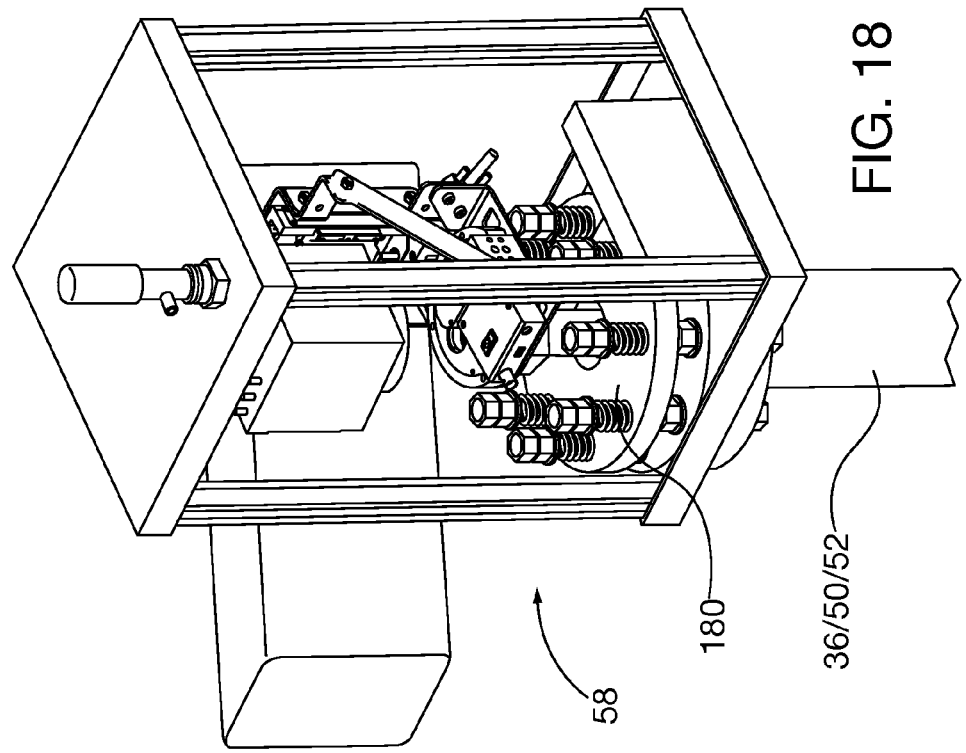
FIG. 18 is a schematic elevational perspective view of an inspection system of the present invention coupled to a gas turbine inspection port.

The camera imaging system 58 hardware components that are coupled to the optical tube housing are shown in FIGS. 18 and 19. The optical tube and camera imaging system 58 are coupled to a turbine inspection port 36, 50, 52 by a port flange mounting ring 180 of known construction that seals the inspection port. A known imaging camera 182 mounts on a camera focus drive 184, with a known servo motor/position encoder 186, that is capable of translating the camera along focus X directional arrow.

Figure 20:
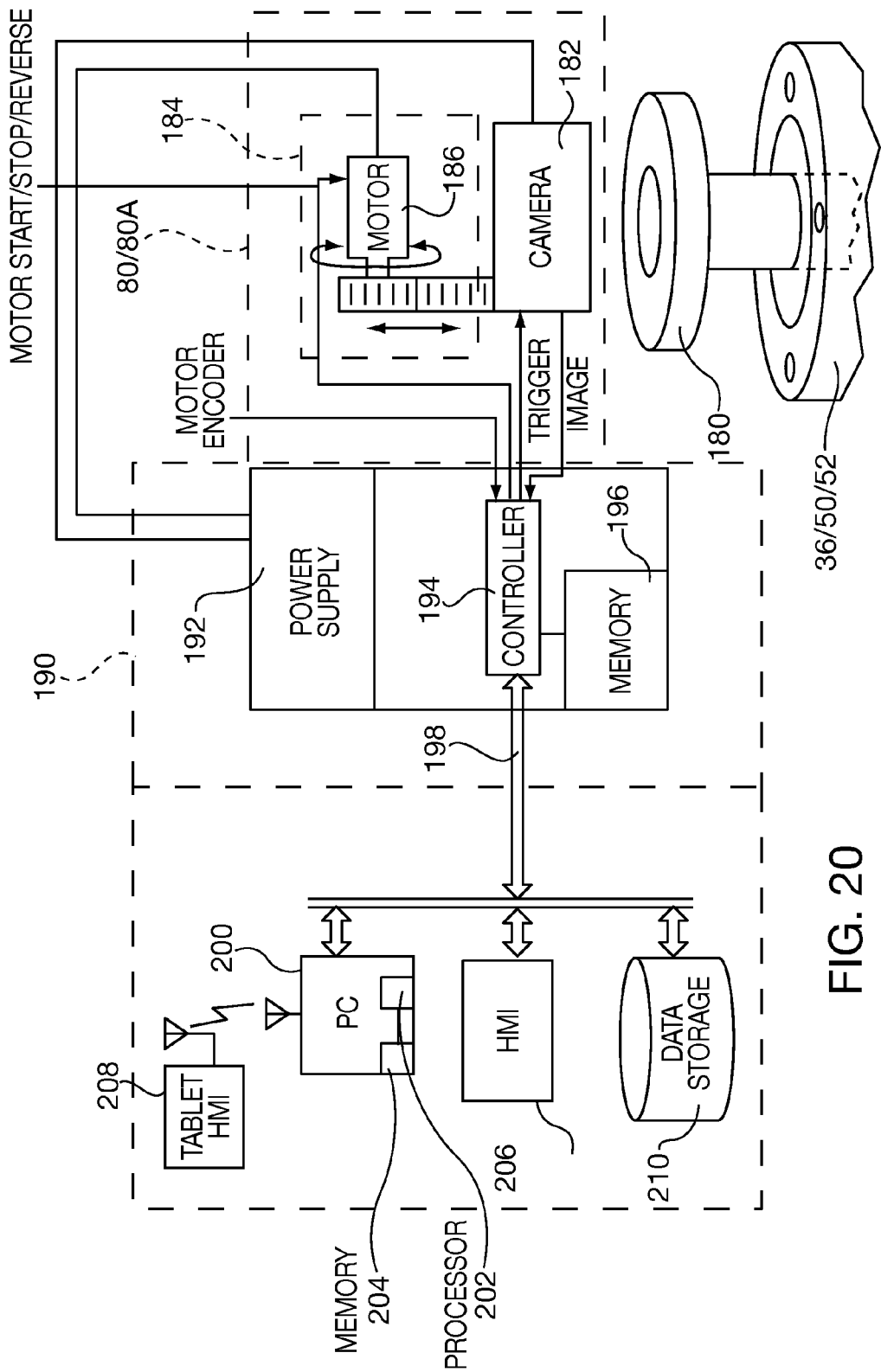
FIG. 20 is a block diagram of an inspection system of the present invention, including the camera inspection system and related electronic/electromechanical control system components.

Referring to FIG. 20, image control system 190 provides power to the camera focus drive motor 186 as well as the camera 182, causes to focus drive motor to start, stop and reverse, based in part on focus drive position information supplied by the encoder of the motor 186, triggers the camera 182 to record images and receives images from the camera for further processing and storage. The image control system 190 includes a known controller 194 that executes program instructions stored in memory 196. The controller 194 is in communication via a bidirectional data pathway (e.g., a cable and/or data bus implementing Ethernet communications protocol) with a host controller 200. An exemplary host controller 200 is a personal computer (PC) having a processor 202 implementing programming instructions accessible in memory 204. A known human machine interface (HMI) 206 is in communication with the PC in order to implement human command, control and monitoring. The PC may also communicate with other HMI devices, such as tablet computer 208 via a known wireless communication protocol, such as Bluetooth protocol. The image control system may include a data storage device to store, process and archive images received from the camera 182.

Prior to starting a gas turbine that is to be inspected, one or more camera inspection systems 80, 80A are individually coupled to respective desired turbine inspection ports 36, 50, 52 by inserting the optical tube 84, 84A therein and affixing the port flange mounting ring 180 to the inspection port. The pressurized cooling gas source 172 injects cooling gas around the optical tube housing 84, 84A and proximal the viewing port 86, 86A. As previously discussed, the cooling gas source 172 may be obtained from the turbine compressor section. The camera 182 captures images of areas of interest within the gas turbine internal components in response to trigger commands received from the image control system 190 and transfers the captured images to the image control system for subsequent processing and archiving.

Summary of Benefits of the Inspection System

Using aspheric lens elements in the camera inspection system of the present invention provides at least the following benefits:

1. Increased life system operational service life: the number of lenses used is reduced, which lead to a reduction in the lens mount mechanical assembly complexity, thus having a direct impact on the life of the system. System and operational service live is enhanced by the present invention lens mount that provides for thermal and vibration compensation. The present invention lens mount reduces likelihood of lens damage and/or misalignment during turbine operation, so that the imaging system is capable of continuous operational service between scheduled turbine maintenance intervals. The combination of the present invention lens mount, capable of temperature and vibration compensation, and the fewer number of needed aspheric lenses in the lens mount optical tube necessary to form an acceptable quality image, further help to increase imaging system service life.

2. Improved signal: the reduction in lenses reduces overall attenuation, and thus leads to an increase in overall system light transmission to the camera.

3. Higher temperature operability: use of fused silica or sapphire, or transparent ceramics, such as spinel and aluminum oxynitride (AION) to form the aspheric and spherical lenses allows higher operational temperature of 1000° C. in continuous operation and 1200° C. for short term operation. This is an improvement of 400° C. over older known designs. The operational temperature range improvement is especially apparent when combined with the lens mount of the present invention, constructed of materials that also withstand higher operational temperature while compensating for thermal and vibration-induced distortion in optical tube components during gas turbine operation.

4. Larger field of view: The field of view can be increased while maintaining an acceptable mechanical assembly level of complexity and image quality. The present invention enables a 50° field of view. Known systems have fields of view of 34° or less.

Although various embodiments which incorporate the teachings of the present invention have been shown and described in detail herein, those skilled in the art can readily devise many other varied embodiments that still incorporate these teachings.

What is claimed is:

1. A camera lens system comprising:
an optical camera imaging lens, having a pair of first and second opposed axial faces, and a circumferential edge between the faces; a lens mount having a bore confining the entire first lens therein, defining an inner surface circumscribing, retaining and directly abutting at least a portion of the lens edge and allowing lens axial displacement therein, while restraining lens radial displacement; a first mounting ring, entirely confined within the lens mount bore, said first ring having a pair of first and second opposed axial faces, and a circumferential edge between the faces, said ring circumferential edge directly abutting and slidably retained within the lens mount bore and inner surface, said ring first axial face in abutting contact with the lens only along the first axial face of said lens, allowing lens axial displacement, a mounting rim defining the second axial face and circumferential edge of said first mounting ring, and a plurality of flexible cantilever fingers respectively having proximal ends coupled to the mounting rim, and distal ends projecting axially away from the rim, which define the first axial face of said first mounting ring, said distal ends deflectable axially and radially inwardly with respect to the housing inner surface, and are in biased abutting contact with the first lens only along the first axial face thereof; and a compression spring biasing element entirely nested and confined within the lens mount bore inner surface, for exerting axially oriented biasing force on the first lens first face through the first mounting ring first face during lens or ring axial displacement caused by ambient temperature or pressure variations experienced by the camera lens system, with outward radial deflection of said biasing element constrained by the lens mount inner surface; and wherein the lens mount as well as each respective lens, mounting ring and biasing element are constructed of materials capable of continuous operation in a varying temperature range up to greater than 1112 degrees Fahrenheit (600 degrees Celsius).

2. The system of claim 1, further comprising a second mounting ring confined entirely within the lens mount bore, having a pair of first and second opposed axial faces, and a circumferential edge between the faces, said second ring circumferential edge directly abutting and slidably retained within the lens mount bore inner surface, said second ring first axial face in abutting contact with the lens only along its the second axial face thereof, the lens being captured between opposed first and second mounting rings.

3. The system of claim 1, wherein the compression spring comprises an annular metallic spring whose deflection is radially outwardly constrained within the lens mount inner surface, having a first spring end in biased abutting relationship with the first mounting ring second face, the compression spring deflecting axially within the lens mount during lens or ring axial displacement caused by ambient temperature or pressure variations experienced by the camera lens system.

4. The system of claim 1, comprising in the lens mount a plurality of said lenses axially spaced relative to each other and respective said first mounting rings corresponding to each lens, said plurality of lenses and first mounting rings slidably restrained within axial confines of the lens mount.

5. The system of claim 4, further comprising at least one second mounting ring entirely confined within the lens mount bore, having a pair of first and second opposed axial faces, and a circumferential edge between the faces, said second ring circumferential edge directly abutting and slidably retained within the lens mount bore inner surface, said second ring first axial face in abutting contact with a corresponding lens only along its said second axial face thereof, said lens being captured between opposed first and second mounting rings.

6. The system of claim 1, wherein the biasing element is selected from the group consisting of a compression spring exerting biasing force on a single lens first face and a compression spring exerting biasing force on a respective first face of multiple lenses.

7. The system of claim 1, wherein the lens comprises an aspheric lens.

8. The system of claim 1, further comprising:
a housing retaining the lens mount;
a viewing port defined by the housing that is aligned with the lens;
a cooling port defined by the housing proximal the viewing port; and
a pressurized gas source coupled to the cooling port, for discharging pressurized gas proximal the viewing port.

9. A camera lens system comprising:
first and second optical camera imaging lenses respectively having a pair of first and second opposed axial faces, and a circumferential edge between the faces, the lenses being axially spaced relative to each other; a lens mount having a bore confining the entire first and second lenses therein, defining an inner surface circumscribing, retaining and directly abutting at least a potions of each lens edge and allowing lens axial displacement therein, while restraining lens radial displacement; respective first mounting rings, entirely confined within the lens mount bore, said first rings respectively having a pair of first and second opposed axial faces, and a circumferential edge between the faces, said ring circumferential edge directly abutting and slidably retained within the lens mount bore and inner surface, each of said first mounting rings first axial face in abutting contact with each corresponding first or second lens only along the respective first axial face thereof and allowing corresponding lens axial displacement, at least one of the first mounting rings including a mounting rim, defining the second axial face and circumferential edge of said first mounting ring, and a plurality of flexible cantilever fingers respectively having proximal ends coupled to the mounting rim, and distal, ends projecting axially away from the rim which define the first axial face of said at least one first mounting ring said distal ends deflectable axially and radially inwardly with respect to the housing inner surface, and in biased abutting contact with the corresponding first lens only along the first axial face thereof; and a compression spring biasing element entirely nested and confined within the lens mount bore inner surface, for exerting axially oriented biasing force on each respective lens first face through its corresponding first mounting ring during lens or ring axial displacement caused by ambient temperature or pressure variations experienced by the camera lens system, with outward radial deflection of said biasing element constrained by the lens mount inner surface; and wherein the lens mount as well as each respective lens, mounting ring and biasing element are constructed of materials capable of continuous operation in a varying temperature range up to greater 111 than 1112 degrees Fahrenheit (600 degrees Celsius).

10. The system of claim 9, further comprising at least one second mounting ring abutting a corresponding lens second axial face, having a rim and fingers as said at least one first mounting ring.

11. The system of claim 9, further comprising second respective mounting rings abutting each corresponding lens only along its respective second axial face, the respective corresponding lens being captured between opposed respective first and second corresponding mounting rings.

12. The system of claim 9, wherein the biasing element is selected from the group consisting of a compression spring exerting biasing force on a single lens first face and a compression spring exerting biasing force on the respective first face of multiple lenses.

13. The system of claim 9, wherein the first lens is an aspheric lens.

14. The system of claim 9, further comprising:
   a housing retaining the lens mount;
   a viewing port defined by the housing that is aligned with the lens;
   a cooling port defined by the housing proximal the viewing port; and
   a pressurized gas source coupled to the cooling port, for discharging pressurized gas proximal the viewing port.

15. The system of claim 9, further comprising a camera inspection system coupled to the lens mount, for generating images transmitted through the lens mount.

16. A method for visually inspecting areas of interest within an operating gas turbine, comprising:
   providing a camera inspection system having:
   a housing defining a viewing port;
   a lens system in the housing aligned with the viewing port, including:
   an optical camera imaging lens having a pair of first and second opposed axial faces and a circumferential edge between the faces;
   a lens mount having a bore confining the entire first lens therein, defining an inner surface circumscribing, retaining and directly abutting at least a portion of the lens edge and allowing lens axial displacement therein, while restraining lens radial displacement; a first mounting ring, entirely confined within the lens mount bore, said first ring having a pair of first and second opposed axial faces, and a circumferential edge between the faces, said ring circumferential edge directly abutting and slidably retained within the lens mount bore and inner surface in abutting contact with the lens only along the first axial face of said lens and allowing lens axial displacement, a mounting rim, defining the second axial face and circumferential edge of said first mounting ring: and a plurality of flexible cantilever fingers respectively having proximal ends coupled to the mounting rim, and distal ends axially away from the rim that, which define the first axial face of said first mounting ring, said distal ends deflectable axially and radially inwardly with respect to the housing inner surface and are in biased abutting contact with the first lens only along the first axial face thereof; and a compression spring biasing element entirely nested and confined within the lens mount bore inner surface, for exerting axially oriented biasing force on the first lens first face through the first mounting ring during lens or ring axial displacement caused by ambient temperature or pressure variations experienced by the camera lens system, with outward radial deflection of said biasing element constrained by the lens mount inner surface; wherein the lens mount as well as each respective lens, mounting ring and biasing element are constructed of materials capable of continuous operation in a varying temperature range up to greater than 1112 degrees Fahrenheit (600 degrees Celsius); and a camera coupled to the lens mount, for generating images transmitted through the lens mount; inserting the camera inspection system housing viewing port into an inspection port of a gas turbine prior to operation thereof, leaving the camera outside of the gas turbine; and generating images of areas of interest within the gas turbine during turbine operation as the turbine varies internal ambient temperature in a range from ambient atmospheric temperature up to greater than 1112 degrees Fahrenheit (600 degrees Celsius) or pressure on the housing and its internal lens system.

* * * * *